(12) United States Patent
Blikas et al.

(10) Patent No.: US 11,049,288 B2
(45) Date of Patent: Jun. 29, 2021

(54) CROSS-DEVICE SUPERVISORY COMPUTER VISION SYSTEM

(71) Applicant: YouAR INC., Portland, OR (US)

(72) Inventors: George Howard Alexander Blikas, Oak Grove, OR (US); Oliver Clayton Daniels, Portland, OR (US)

(73) Assignee: YouAR INC., Portland, OR (US)

( * ) Notice: Subject to any disclaimer, the term of this patent is extended or adjusted under 35 U.S.C. 154(b) by 0 days.

(21) Appl. No.: 16/927,081

(22) Filed: Jul. 13, 2020

(65) Prior Publication Data

US 2020/0342680 A1    Oct. 29, 2020

Related U.S. Application Data

(63) Continuation of application No. PCT/US2019/013328, filed on Jan. 11, 2019.

(60) Provisional application No. 62/648,241, filed on Mar. 26, 2018, provisional application No. 62/616,368, filed on Jan. 11, 2018, provisional application No. 62/616,366, filed on Jan. 11, 2018.

(51) Int. Cl.
  *G06T 19/00*   (2011.01)
  *G06T 11/00*   (2006.01)
  *G06T 7/70*    (2017.01)
  *G06T 3/20*    (2006.01)

(52) U.S. Cl.
  CPC ............... *G06T 11/00* (2013.01); *G06T 3/20* (2013.01); *G06T 7/70* (2017.01); *G06T 19/006* (2013.01); *G06T 2207/10028* (2013.01); *G06T 2207/30244* (2013.01)

(58) Field of Classification Search
  CPC ........... G06T 19/006; G06T 7/74; G06T 7/70; G06T 3/20; G06T 11/00; G06T 7/77; G06T 2207/10028; G06T 2207/30244; G06T 2207/20076; G06T 19/00; G06K 9/00671
  See application file for complete search history.

(56) References Cited

U.S. PATENT DOCUMENTS

2008/0310757 A1   12/2008   Wolberg et al.
2010/0232709 A1    9/2010   Zhang et al.
(Continued)

OTHER PUBLICATIONS

U.S. Receiving Office, International Search Report and Written Opinion of the International Searching Authority, dated Mar. 29, 2019, in PCT/US2019/013328, which this U.S. application claims the benefit of priority.
(Continued)

*Primary Examiner* — Xilin Guo
(74) *Attorney, Agent, or Firm* — Kolitch Romano LLP

(57) ABSTRACT

A supervisory computer vision (CV) system may include a secondary CV system running in parallel with a native CV system on a mobile device. The secondary CV system is configured to run less frequently than the native CV system. CV algorithms are then run on these less-frequent sample images, generating information for localizing the device to a reference point cloud (e.g., provided over a network) and for transforming between a local point cloud of the native CV system and the reference point cloud. AR content may then be consistently positioned relative to the convergent CV system's coordinate space and visualized on a display of the mobile device. Various related algorithms facilitate the efficient operation of this system.

20 Claims, 7 Drawing Sheets

(56) References Cited

U.S. PATENT DOCUMENTS

| | | |
|---|---|---|
| 2010/0315412 A1 | 12/2010 | Sinha et al. |
| 2012/0075342 A1* | 3/2012 | Choubassi .............. G06T 17/00 |
| | | 345/633 |
| 2012/0300020 A1 | 11/2012 | Arth et al. |
| 2014/0002597 A1* | 1/2014 | Taguchi .................... G06T 7/74 |
| | | 348/43 |
| 2014/0212027 A1 | 7/2014 | Hallquist et al. |
| 2015/0186745 A1 | 7/2015 | Martini |
| 2015/0186746 A1 | 7/2015 | Martini |
| 2015/0310135 A1 | 10/2015 | Forsyth et al. |
| 2016/0071278 A1 | 3/2016 | Leonard et al. |
| 2016/0140729 A1 | 5/2016 | Soatto et al. |
| 2017/0148186 A1 | 5/2017 | Holzer et al. |
| 2017/0186164 A1 | 6/2017 | Seetharaman et al. |
| 2017/0243352 A1 | 8/2017 | Kutliroff et al. |
| 2017/0301104 A1* | 10/2017 | Qian ...................... G06F 16/583 |
| 2018/0005450 A1 | 1/2018 | Daniels et al. |

OTHER PUBLICATIONS

U.S. Receiving Office, International Search Report and Written Opinion of the International Searching Authority, dated Mar. 29, 2019, in PCT/US2019/013342, which this U.S. application claims the benefit of priority.

\* cited by examiner

CROSS-DEVICE SUPERVISORY COMPUTER VISION SYSTEM

CROSS-REFERENCES

The following related applications and materials are incorporated herein, in their entireties, for all purposes: PCT Application No. PCT/US2019/013328, filed Jan. 11, 2019; U.S. Provisional Patent Application Ser. No. 62/616,366, filed Jan. 11, 2018; U.S. Provisional Patent Application Ser. No. 62/616,368, filed Jan. 11, 2018; and U.S. Provisional Patent Application Ser. No. 62/648,241, filed Mar. 26, 2018.

FIELD

This disclosure relates to systems and methods for computer vision (CV) and augmented reality (AR). More specifically, to systems and methods for positioning computer-generated augmented reality content with improved precision and accuracy across devices and platforms.

SUMMARY

The present disclosure provides systems, apparatuses, and methods relating to computer vision and augmented reality.

In some embodiments, a computer-implemented method for displaying augmented reality (AR) content may include determining, using a camera of a mobile digital device (MDD) and a computer vision (CV) system of the MDD, a position and an orientation of the MDD relative to a reference point cloud corresponding to a trackable feature in an environment, the MDD being disposed in the environment; and visualizing an AR content item on a display of the MDD using the determined position and orientation; wherein determining the position and the orientation of the MDD relative to the reference point cloud includes executing a weighted random sample consensus (RANSAC) method using processing logic to estimate a pose of the camera, wherein the weighted RANSAC method comprises: receiving an output from a RANSAC algorithm, wherein the output comprises a current estimated pose determined by the RANSAC algorithm, and wherein the RANSAC algorithm uses an inlier distance threshold to determine inliers and selects one or more correspondences based on a calculated weighting of a plurality of points; updating the calculated weighting of the plurality of points; determining a strength of the current estimated pose based on the current inlier distance threshold and how many points currently qualify as inliers; and repeating the receiving of the output from the RANSAC algorithm, the updating of the calculated weighting, and the determining of the strength of the current estimated pose, wherein the inlier distance threshold used by the RANSAC algorithm is automatically reduced at each iteration.

In some embodiments, a system for camera localization may include a mobile digital device (MDD) disposed in an environment, the MDD including a camera and processing logic configured to determine a position and an orientation of the MDD relative to a reference point cloud corresponding to a trackable feature in the environment, using a computer vision (CV) system of the MDD and the camera; wherein determining the position and the orientation of the MDD relative to the reference point cloud includes executing a weighted random sample consensus (RANSAC) method using processing logic to estimate a pose of the camera, wherein the weighted RANSAC method comprises: performing a RANSAC algorithm to determine a current estimated pose, using an inlier distance threshold to determine inliers and selecting candidate correspondences based on a calculated weighting of a plurality of points; updating the calculated weighting of the plurality of points based on respective relationships between each point and the current inlier distance threshold; determining a strength of the current estimated pose based on a current quantity of inlier points and the current inlier distance threshold; and repeating the RANSAC algorithm, the updating of the calculated weighting, and the determining of the strength of the current estimated pose, automatically reducing the inlier distance threshold with each iteration.

In some embodiments, a computer-implemented method for displaying augmented reality (AR) content may include determining, using a camera of a mobile digital device (MDD) and a computer vision (CV) system of the MDD, a position and an orientation of the MDD relative to a reference point cloud corresponding to a trackable feature in an environment, the MDD being disposed in the environment; and visualizing an AR content item on a display of the MDD using the determined position and orientation; wherein determining the position and the orientation of the MDD relative to the reference point cloud includes obtaining an estimated pose of the camera, and wherein obtaining the estimated pose of the camera includes: determining a best candidate pose, wherein determining the best candidate pose includes: determining a plurality of candidate poses based on respective subsets of correspondences, each correspondence comprising a 3D point and a corresponding 2D point, and each respective subset being randomly selected from a larger set of correspondences based on a selected weighting of the correspondences, determining a respective number of inliers for each of the candidate poses, wherein the respective number of inliers comprises a number of correspondences for which the 2D point of the correspondence is consistent, within an inlier distance threshold, with a reprojection of the 3D point of the correspondence based on the respective candidate pose; and identifying the best candidate pose among the plurality of candidate poses, based on the numbers of inliers; updating the selected weighting of the correspondences based on a calculated fitness of each correspondence with respect to the best candidate pose; determining a strength of the best candidate pose based on the inlier distance threshold and the number of inliers corresponding to the best candidate pose; and repeating the determining of the best candidate pose based on the updated selected weighting and an updated inlier distance threshold, the updating of the selected weighting, and the determining of the strength of the best candidate pose.

Features, functions, and advantages may be achieved independently in various embodiments of the present disclosure, or may be combined in yet other embodiments, further details of which can be seen with reference to the following description and drawings.

DETAILED DESCRIPTION

Figure 1:
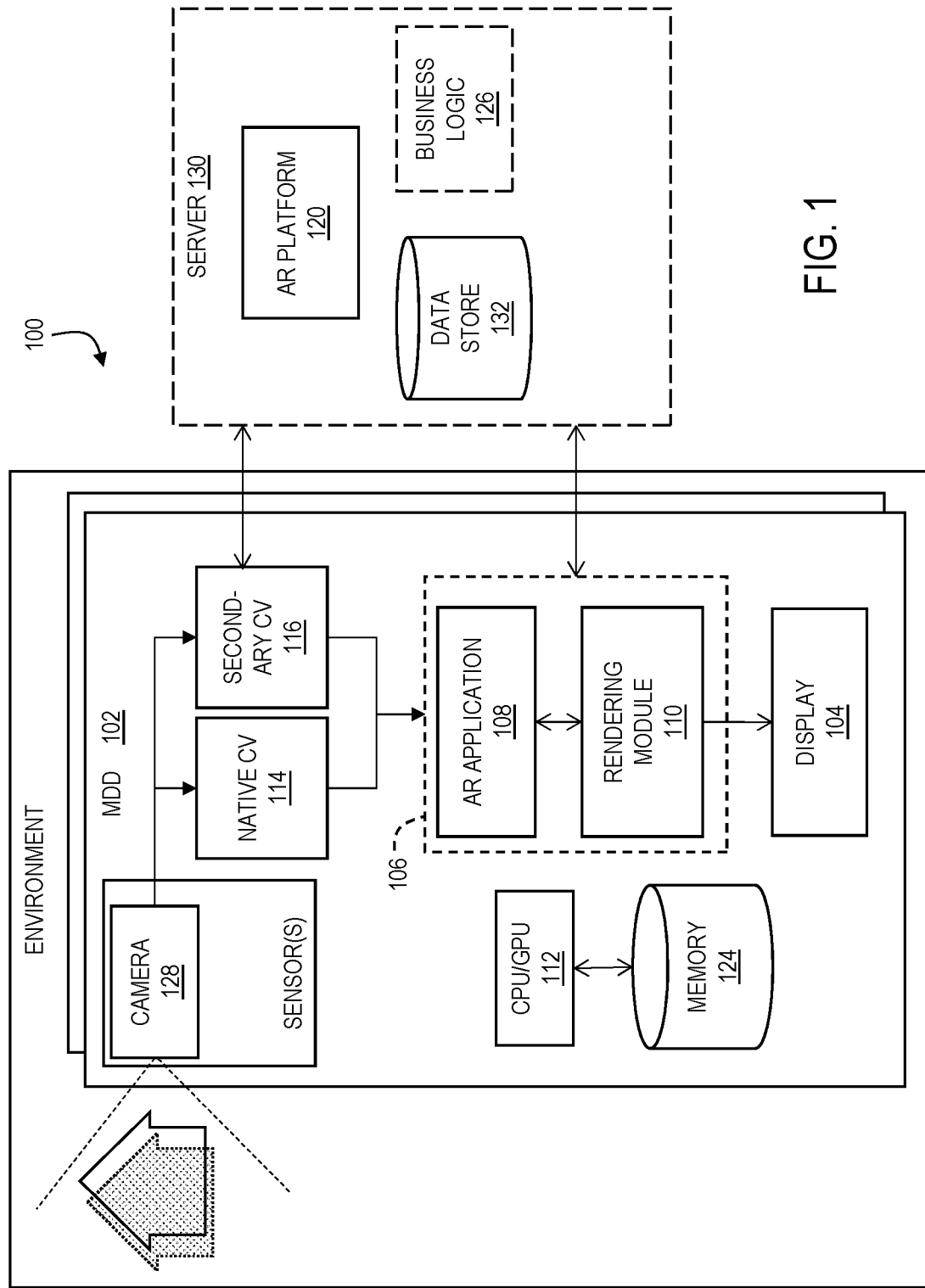
FIG. 1 is a schematic diagram of an illustrative convergent CV system including a plurality of mobile digital devices (MDDs) operating in an environment.

Various aspects and examples of methods and systems relating to a cross-device supervisory computer vision (CV) system, including localizing images in relation to described point clouds as well as localizing and positioning augmented reality (AR) content, are described below and illustrated in the associated drawings. Unless otherwise specified, a supervisory CV system in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; and (5) Conclusion. The Examples, Components, and Alternatives section is further divided into subsections A through E, each of which is labeled accordingly.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Coupled" means connected, either permanently or releasably, whether directly or indirectly through intervening components, and is not necessarily limited to physical connection(s).

"Processing logic" means any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

"AR technology" refers to a large group of technologies, including all forms of computer vision, structured light (e.g., infrared, laser), inertial measurement units (IMU) (e.g., gyroscopes, compasses, accelerometers), non-visible waves (e.g., sonar), motion libraries (e.g., pedestrian dead reckoning (PDR)), and/or technologies by which geometry can be ascertained to relate or ground a point or place—and that is used to align AR content (e.g., artwork) or AR events to geometric spatial reality or local physical environment in proximity to any viewer or user of an AR-capable visual device.

"Trackable" refers to a feature (e.g., a physical feature or object in a real-world environment) or set of features (that can be tracked with AR technology) that has been recognized and has had the data which would enable a mobile device to identify the feature and calculate its position relative to the mobile device recorded or stored. In some cases, this data includes an estimated or actual geographic coordinate position, such as WGS coordinates or cell-based coordinates described below. A trackable may provide relative position and pose information to a mobile digital device (MDD).

"AR content" includes any visual, auditory, haptic, or other sensory event created by a user or developer to be experienced in AR, through any number of computing devices. These events may include images, animations, live action footage, programs, code, sounds, or haptic feedback (e.g., vibrations or forces applied to simulate a sense of touch), and the hierarchies of objects (including but not limited to shaders, particles, lights, voxels, avatars, scripts, programs, procedural objects, images, or visual effects) that can make up these events.

An "AR application" is any suitable computer application configured to display (or otherwise present) AR content overlaid on (or incorporated into) a real-time view of a real-world environment. AR applications may be stored in a computer device, which includes at least one local storage device to store the computer application(s) and user data.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, a supervisory or "convergent" CV system in accordance with the present teachings may include a secondary CV system running in parallel with a primary or "native" CV system on each connected device. The secondary CV system of the convergent CV system is configured to run more slowly than the native CV system (e.g., sampling imagery every 30 frames, as opposed to every frame). Computer vision algorithms are then run on these less-frequent sample images, generating information for localizing the device to a reference point cloud (e.g., provided over a network) and for transforming between a local point cloud of the native CV system and the reference point cloud. Each device that wishes to be part of the overall system may have running on it an individual, independent instance of the convergent CV system software, configured to access and share relevant data over the network. This arrangement facilitates relocalization of even a single device, which allows persistent content on a cross-device basis. In general, a transform is calculated between the convergent CV system's point cloud coordinate space and the native CV system's local coordinate space. AR content may then be consistently positioned relative to the convergent CV system's coordinate space and visualized on a display of the mobile device. Various related algorithms are described herein, for facilitating the efficient operation of this system.

For example, two improved algorithms help to facilitate this solution, each of which may be employed individually or in tandem with the other. First, an iterative weighted RANSAC method (short for "random sample consensus") may be used to provide superior robustness in localization of positions of cameras relative to large point clouds. This improved algorithm is referred to herein as weighted RANSAC, or WRANSAC. Second, an improved bundle adjustment method, referred to herein as constrained bundle adjustment (CBA), takes the camera positions (e.g., from the WRANSAC method) and the poses of the native CV, and improves the positions relative to the point cloud to create an optimized transform that can be used to position AR content relative to the convergent system's cloud (e.g., between the less-frequent frames of the secondary system).

In addition to improving accuracy and precision, systems and methods of the present disclosure address issues with the following aspects of known systems: (a) an inability for different CV systems to independently relocalize into the same space, where "localizing" means determining the pose of an object with respect to a particular coordinate system; (b) two devices with different CV systems have difficulty positioning themselves in the same space, e.g., to understand their relative positions; and (c) even two devices with same type of CV (e.g., ARKit, ARCore) do not have the capability to relocalize in the same space, relative to each other.

Technical solutions are disclosed herein for positioning computer-generated augmented reality content with improved precision and accuracy across devices and platforms. The disclosed systems and methods address a technical problem tied to computer vision and AR technology. The system and method disclosed herein solves this technical problem by, among other things, implementing improved algorithms for localization, positioning of content, and coordination across devices and/or platforms. Accordingly, the disclosed systems and methods do not merely recite the performance of some known practice along with the requirement to perform it on a computer. Rather they provide a solution necessarily rooted in computer technology to overcome a problem specifically arising in the realm of computers.

Aspects of the convergent CV system described herein may be embodied as a computer method, computer system, or computer program product. Accordingly, aspects of the convergent CV system may take the form of a processing logic embodiment, an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the or convergent CV system may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium.

A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk or solid state drive, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium, on the other hand, may include a propagated data signal with computer-readable program code embodied therein, for example, in baseband or as part of a carrier wave. Such a propagated signal may take any of a variety of forms, including, but not limited to, electro-magnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the convergent CV system may be written in one or any combination of suitable programming languages, including an object-oriented programming language such as Java, C++, and/or the like, and conventional procedural programming languages, such as C. Mobile apps may be developed using any suitable language, including those previously mentioned, as well as Objective-C, Swift, C #, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the convergent CV system are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to relevant processing logic, such as a processor of a general purpose computer, special purpose computer, or other programmable data processing apparatus to produce a machine, such that the instructions, which execute via the processor of the computer or other programmable data processing apparatus, create a device for implementing the functions/acts specified in the flowchart and/or block diagram block(s). In some examples, machine-readable instructions may be programmed onto a programmable logic device, such as a field programmable gate array (FPGA).

These computer program instructions can also be stored in a computer-readable medium (e.g., a computer readable storage medium) that can direct a computer, other programmable data processing apparatus, and/or other device to function in a particular manner, such that the instructions stored in the computer-readable medium produce an article of manufacture including instructions which implement the function/act specified in the flowchart and/or block diagram block(s).

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the convergent CV system. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

EXAMPLES, COMPONENTS, AND ALTERNATIVES

The following sections describe selected aspects of exemplary convergent CV systems, as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Convergent CV System

As shown in FIGS. 1-5, this section describes an illustrative supervisory or convergent computer vision (CV) system 100 and related methods. System 100 is an example of the convergent system described in the Overview above.

FIG. 1 is a block diagram depicting an illustrative AR system utilizing convergent CV system 100 according to the present teachings. In this example, one or more embodiments of a mobile digital device (MDD) 102 (e.g., a smart phone) are used to receive information about AR content and to selectively display AR content to a user (i.e., on a display 104 of the MDD). In this example, an onboard AR system 106 includes an AR application 108 and a rendering module 110, executable by onboard processing logic 112, e.g., a central processing unit (CPU) and/or graphical processing unit (GPU). Data is exchanged with a server 130 over a computer network, and storage is carried out using an onboard memory 124 of the MDD.

The MDD includes a native CV system 114, configured to operate at full speed (e.g., 30 fps or 60 fps) with a camera 128 of the MDD, and a parallel, secondary CV system 116 configured to function with camera 128 as part of CV system 100. In some examples, CV systems 114 and 116 are referred to collectively as the CV system of the MDD. Although systems of the present disclosure are described with respect to camera 128, any suitable sensor of MDD 102 may be used, of which camera 128 is only one example.

An AR platform 120 operates over the network, e.g., on server 130, to provide coordination and other features. A data store 132 of server 130 is queried to return data (e.g., metadata) describing the AR content (objects, trackables, etc.) in the local environment. This AR data includes the coordinates of each AR item, based on a selected coordinate system. The AR content information is stored (e.g., in memory 124) in a format suitable for rendering, e.g., by processing logic 112 of the MDD. Rendering module 110 renders the AR content using the downloaded coordinates and other data. Data store 132 may also be utilized to store information regarding point cloud(s) of the convergent CV system. This reference point cloud data can then be shared with any given MDD 102. Additional business logic software 126 and related module(s) may be present on server 130.

Figure 2:
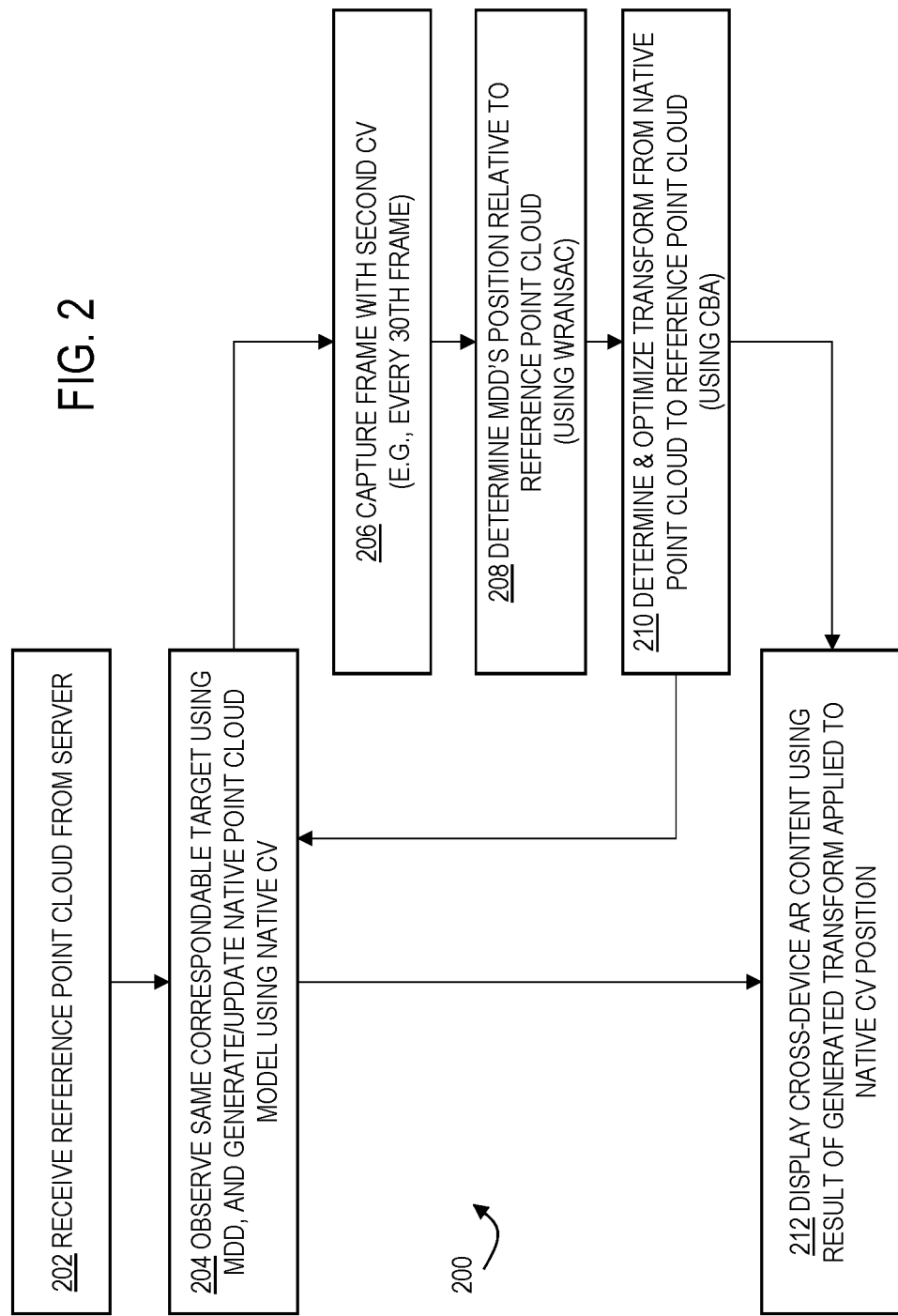
FIG. 2 is a flow chart depicting steps of an illustrative convergent CV method, showing an overview of the display of AR content on an MDD running a convergent CV system according to the present teachings.
Figure 3:
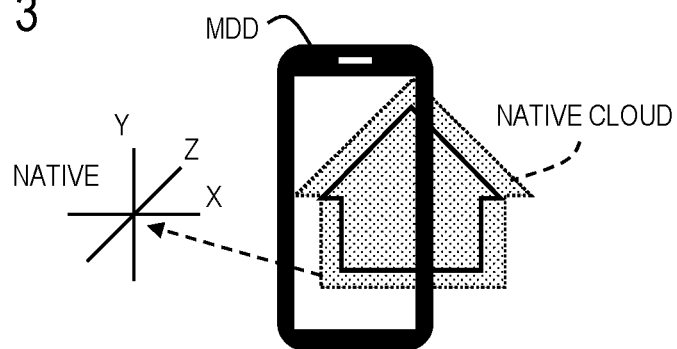
FIG. 3 is a schematic diagram illustrating a step of a method for displaying AR content.
Figure 4:
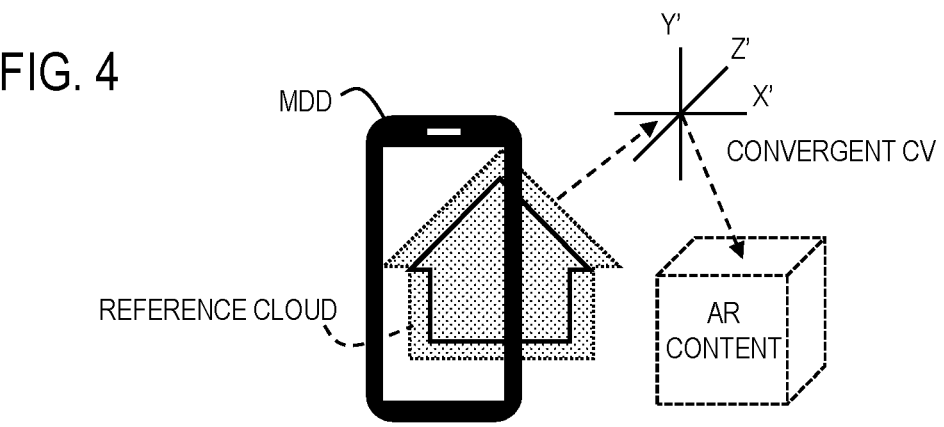
FIG. 4 is a schematic diagram illustrating a second step of a method for displaying AR content.
Figure 5:
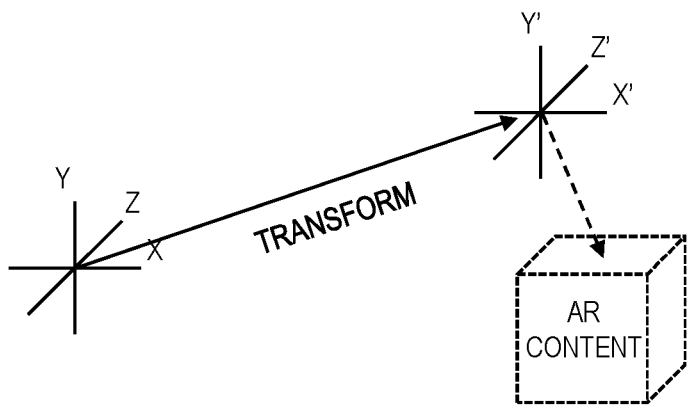
FIG. 5 is a schematic diagram illustrating a third step of a method for displaying AR content.

FIG. 2 represents steps of an illustrative method 200 for displaying AR content across devices using a convergent CV system such as system 100, and FIGS. 3-5 provide visual representation of selected aspects of method 200. Aspects of systems described elsewhere herein may be utilized in the method steps described below. Where appropriate, reference may be made to components and systems that may be used in carrying out each step. These references are for illustration, and are not intended to limit the possible ways of carrying out any particular step of the method.

FIG. 2 is a flowchart illustrating steps performed in an illustrative method, and may not recite the complete process or all steps of the method. Although various steps of method 200 are described below and depicted in FIG. 2, the steps need not necessarily all be performed, and in some cases may be performed simultaneously or in a different order than the order shown.

At step 202, a reference point cloud is received by a participating MDD from a server of the convergent CV system network.

At step 204, a target corresponding to the reference point cloud is observed using the MDD (e.g., a camera of the MDD). A corresponding local point cloud is recognized by the native CV system. In some examples, recognizing the local point cloud includes generating, identifying, and/or updating the native CV system's point cloud model based on this observation, e.g., using the camera and native CV system. As discussed above, this step is performed at a first frequency (e.g., the standard frames-per-second rate defined by the native CV system). In some examples, step 204 is performed at least once per frame. An example of this operation is depicted in FIG. 3, where the native point cloud is shown with its native coordinate system and origin.

Every Nth frame (e.g., once every 10 to 60 frames, more specifically once every 30 frames, etc.), step 206 includes capturing a frame using a convergent CV system installed on the MDD (e.g., using the same or a different camera). At step 208, the system then determines the MDD's position relative to the reference point cloud. This step may include utilization of a WRANSAC method (described below). At step 210, the system then determines a transform from the native point cloud to the reference point cloud. Step 210 may include utilization of a CBA method (described below). FIG. 4 depicts an example of the reference point cloud and its corresponding coordinate system and origin, as well as an illustrative AR content item having a position defined relative to the convergent CV reference coordinate system.

At step 212, AR content (such as that shown in FIGS. 4-5) is displayed on a display of the MDD, wherein the position of the AR content is determined by applying the transform determined in step 210 to the position determined natively (i.e., by the native CV system). See FIG. 5. Accordingly, the transform of step 210 is used to "correct" the position of the AR content. Because all MDDs coupled to the network may have access to the reference point cloud, AR content can therefore be displayed in a consistent real-world position for all such MDDs, on a cross-device basis. Step 212 is performed at the first frequency (e.g., every frame), by the native CV system using the latest transform. The transform used by the system is updated at a lower, second frequency (e.g., once every 30 frames) as described above.

B. Illustrative Weighted RANSAC Method

Figure 6:
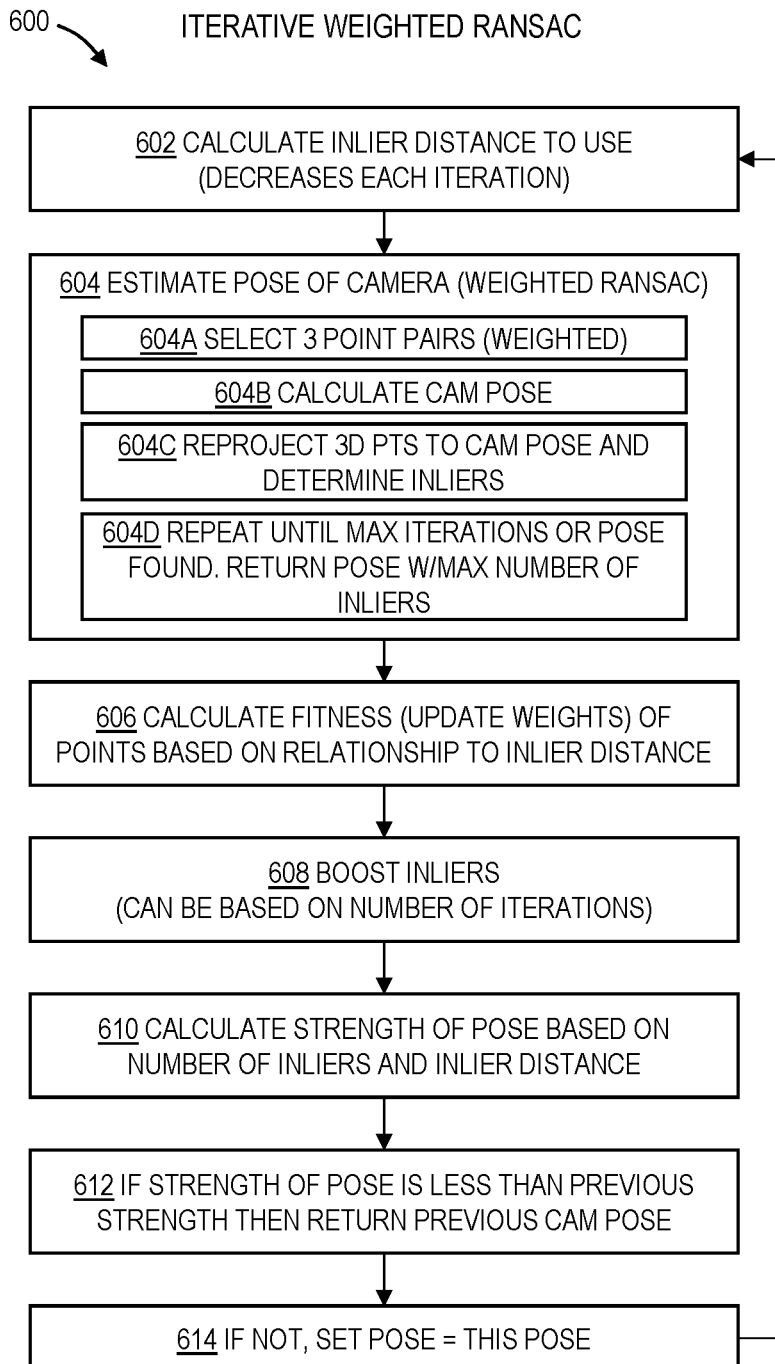
FIG. 6 is a flow chart depicting steps of an illustrative method for performing iterative weighted RANSAC in accordance with the present disclosure.

This section describes steps of an illustrative weighted RANSAC (RANdom SAmple Consensus) method 600 for localization of an image in relation to a described point cloud; see FIG. 6. Method 600 may be performed by processing logic of one or more portable devices (e.g., MDDs) and/or of a network-connected server (e.g., server 130). Aspects of systems and methods described above may be utilized in the method steps described below. Where appropriate, reference may be made to components and systems that may be used in carrying out each step. These references are for illustration, and are not intended to limit the possible ways of carrying out any particular step of the method.

In general, systems and methods relating to a narrowing, weighted, iterative RANSAC method may include or be associated with computer vision-related applications (software and/or hardware/processing logic). These systems and methods utilize a novel iterative, weighted RANSAC (WRANSAC) method to iterate (in an iterative, narrowing sense) to determine model parameters. WRANSAC method 600 may be used to localize a camera's position to a reference point cloud, and may also be generalized to other uses. Localizing to large data sets is a difficult problem, and larger data sets result in even more difficulty.

Standard RANSAC is an iterative technique for estimating parameters of a mathematical model from a set of observed data that contains outliers (due to noise, etc.). RANSAC is a non-deterministic algorithm, in that it produces a reasonable result only with a certain probability. The probability increases with the number of iterations.

Known RANSAC methods operate as follows, in the context of CV systems. Out of a cloud of possible correspondences, the method selects a small number, usually three. The method then assumes these three correspondences are correct, and creates the optimal camera pose for the three. All points are then reprojected back into the screen. Using a cutoff threshold (e.g., 3 pixels), the method then determines which correspondences are "inliers" (i.e., correct) and which are "outliers." The previous steps are then repeated for other sets of three correspondences, until one is found that satisfies some existing criteria (e.g., having the most inlier points). A final perspective-n-point (PnP) algorithm is then run to estimate the pose of the camera.

The performance of this basic RANSAC algorithm fails to scale with the size of the point cloud. This is because, as the scale of the cloud increases, the chances of finding inliers in any random set of correspondences gets exponentially worse. In other words, as the percentage of outliers goes up, the time taken to find a good pose goes up at a greater rate. As larger point clouds typically have a higher percentage of "bad" data, the basic RANSAC solution is less than adequate.

WRANSAC methods of the present disclosure operate in a narrowing fashion to quickly find a coherent pose even with a large subset of points with noisy data. These methods address the problem described immediately above in two ways. First, rather than randomly selecting the three (or however many) point pairs, a weighted random selection is made, such that some points are chosen more often than others. Second, rather than starting from scratch and selecting from the full pool of points each time, multiple stages are utilized with each stage removing a greater portion of the outlier pool than the inlier pool. Accordingly, the ratio between inliers and outliers improves over time.

FIG. 6 is a flowchart illustrating steps performed in an illustrative method, and may not recite the complete process or all steps of the method. Although various steps of method 600 are described below and depicted in FIG. 6, the steps need not necessarily all be performed, and in some cases may be performed simultaneously or in a different order than the order shown.

At step 602, an inlier distance threshold is calculated, beginning with a relatively large inlier distance (e.g., 280 px). With each iteration, this inlier distance threshold is calculated to be smaller.

At step 604, the pose of the camera is then estimated using a WRANSAC method. Specifically, step 604A includes selecting a predetermined number (e.g., 3) of point pairs. This selection takes into account a weighting of the points (based on fitness) initially based on prior knowledge and then updated as the overall method iterates. The weights are indicative of how likely a given point is to be an inlier. For example, initial point weighting may be based on known tracking errors associated with the data (e.g., a function of an inverse of the tracking error), and/or any combination of suitable factors configured to approximate a likelihood of inlier status. In some examples, points are matched with descriptors, such as ORB, and the initial weights may be set as a function of the inverse matching distance, such that those that are "closer" have larger weights. In some examples, initial weights may be a function of how many frames contain a given 3D point (indicating a likelihood to be in other frames). In some examples, initial weighting may be random or pseudo-random, relying on subsequent iterations to improve the approximation of fitness.

Regardless of the initial weighting method, the weights of the points influence how likely each one is to be selected in step 604A. Step 604B then includes calculating the pose of the camera with an assumption that those point pairs are valid. Step 604C includes reprojecting the three-dimensional (3D) points using this camera pose, and determining inliers based on the distance determined in step 602. Step 604D includes repeating steps 604A through 604C a maximum number of times or until a satisfactory pose is found. This process may return the pose with the maximum number of inliers.

At step 606, the weights of the points are updated by (re)calculating a fitness of each of them. Using the assumed-to-be coherent pose from step 604, all points are reprojected and the points are compared to the inlier distance threshold of step 602. Based on their relationship to the inlier distance threshold, each point is given a new weight. For example, all points above a selected threshold or cutoff point may be given a minimal, nonzero weight, while all points within the threshold are weighted on a curve. Note that points outside the threshold in a given iteration are given a nonzero weight. This ensures that (a) the method does not hang up when only one or two points are within the threshold limit, and (b) ensures that all points have a chance of being selected in the next round, albeit a low chance.

At step 608, points falling within the current inlier distance threshold are further boosted. Each iteration returns a number of inliers that are coherent with the specific pose. These are given an additional weight (e.g., multiplied by 2). In some examples, this boosting factor may be increased with each iteration (i.e., as the inlier distance threshold goes down).

With a goal of finding an inlier distance threshold that is the smallest possible while also having an acceptable number of inliers, the method performs a check to ensure a desirable balance is maintained between the two. For example, in step 610, a strength of the current pose is calculated, based on the number of inliers and the current inlier distance threshold. This strength or fitness measurement is utilized to monitor whether the current iteration has produced a better or worse pose, as compared with previous iterations. Accordingly, step 612 includes reverting to the previous pose. Meanwhile, step 614 includes updating the best known pose to the current one if the fitness has not gotten worse.

Returning to step 602, the inlier distance threshold is then automatically reduced. For example, the inlier distance may be halved in each iteration.

The following is a pseudocode description of an illustrative WRANSAC method, substantially similar to method 600, followed by notes on various aspects of the pseudocode description:

```
var Weights, prevCam, inliers
fillWeights(Weights)
for(int iterations=0; iterations<iEnd; iterations++):
    inlierDistance=DistanceFunction(iterations, iStart)
    solvePnPRansacWeighted(Points3D, Points2D,
        Weights, Cam, inlierDistance, inliers)
    calculateNewWeights(Weights, Points3D, Points2D,
        Cam, inlierDistance)
    boost(inliers, Weights)
    var strength=calculateStrength(inliers, inlierDistance)
    if(strength<prevStrength):
        return prevCam
    prevCam=Cam
    return Cam
```

The above function can be extended to two-frame localization, rather than single-frame localization, by using the final Weights for points as the initial weights for the second frame (essentially removing many of them from contention). In some examples, points that have weights below a threshold (dynamic or static) may be culled entirely.

Boosting (Boost( ))

Boosting increases the weights of a specific subset of the points. One implementation of boosting is multiplying the weights of all inliers by a fixed number (e.g., 2). As the inliers are the largest discovered set of coherent inliers, this increases the speed of convergence to a large coherent set.

Boosting Curves (Boost(Inliers, Weights, Iterations))

Rather than having a fixed multiplier, boosting may operate on a curve, increasing or decreasing the amount of boosting based on how many iterations have passed. In some examples, boosting may vary based on how boosted a point has been previously.

Distance Function

The distance function calculates the inlier distance to use for a given iteration. The default inlier distance curve starts at a specific number (e.g., 280 pixels), then dividing that by two for each successive iteration (140, 70, 35, etc.), iteratively narrowing the inlier distance.

Fitness (calculateNewWeights:

Fitness, i.e. the new calculated weight of each point, is intended to approximate the probability that a given point will be in the final coherent pose.

This algorithm works via weighted-random selection of three points from the set of points, calculating the ideal cam pose from these three points, and then reprojecting the 3D points, and seeing how many are inliers. This is repeated until a "good" match is found (or an iteration cap is reached). Accordingly, the number of times a given point is an inlier may (in some examples) be utilized as a rough approximation of its general likelihood of being an inlier, and therefore as a proxy for its likelihood of being in the final coherent pose.

In some examples, instead of using the number of inliers, the inverse of the sum of the reprojection errors is used for each pose, which is a more continuous number. The amount of reprojection error may be capped, to avoid situations where the error's magnitude swamps other factors. In some examples, this cap may be set at twice the inlier distance.

In some examples, fitness may be generated by taking the coherent pose from each iteration, and reproject the points into that pose, then using the inverse (or complement) of the reprojection error as the weights. Similar to the above method, this needs to be capped. If the inverse is used, a minimum reprojection error would be specified to avoid dividing by really small numbers. If the method instead subtracts the reprojection error from a selected number to get the weight, then the selected number being subtracted from may be set at double the inlier distance. This needs to be clamped above zero, to avoid negative weights.

Using the above methods, a set may sometimes become degenerate, in the sense that the weights of one or two points go to infinity, or the weights of all but one or two points go to zero. What this means is that standard weighted selection algorithms will take an unreasonably long time. While one could use non-standard algorithms, it is more beneficial to simply set the floor for any weight to be a small number, such as 0.5, or one hundredth of the highest value.

Stopping Criteria & Strength

As the inlier distance is monotonically decreasing, unlike in ordinary RANSAC, one cannot simply pick the result with the highest number of inliers. Instead, a "strength" score is calculated by taking the inlier distance and number of inliers into account. As an example, this strength score may be determined by the following: sigmoid=-1/(1+2^(-(inlierdist-20)/6))+1, where strength=(24.265*sigmoid) if the number of inliers is above 75, and strength=(number_of_inliers-number_of_inliers^1.45)*sigmoid otherwise.

C. Illustrative Constrained Bundle Adjustment Method

This section describes steps of an illustrative constrained bundle adjustment (CBA) method 800 for determining an optimized mathematical transform between a native coordinate system and a reference coordinate system, as described above; see FIG. 8. Aspects of systems and methods described above may be utilized in the method steps described below. Where appropriate, reference may be made to components and systems that may be used in carrying out each step. These references are for illustration, and are not intended to limit the possible ways of carrying out any particular step of the method.

In general, Constrained Bundle Adjustment (CBA), also referred to herein as Bi-Objective Bundle adjustment, or Multi-Objective Bundle adjustment, is a novel extension of the standard bundle adjustment algorithm to add additional constraints or components to the function being minimized. Known bundle adjustment (BA) methods are typically utilized to minimize reprojection error on two camera spaces. Given a list of poses, a list of 3D points in the point cloud, and a list of projection matrices, the goal of the basic BA method is to simultaneously readjust both the camera poses and the 3D points, such that their reprojection error onto the screen is minimized. The minimization function of regular BA is based on reprojection error. Methods such as gradient descent or Levenberg Marquardt are then applied to minimize the reprojection error, optimizing the 3D positions of the points and the poses of the cameras at the same time.

More specifically, a basic BA method may be described as follows. The BA method generally attempts to simultaneously refine a set of initial camera and structure parameter estimates, to find a set of parameters that accurately predicts the locations of the observed points in a set of available images. Specifically, BA methods minimize a "total reprojection error" function (e.g., using gradient descent or the like), with respect to all 3D point and camera parameters. This may be mathematically represented as follows:

$$\min_{a_j, b_i} \sum_{i=1}^{n} \sum_{j=1}^{m} v_{ij} d(Q(a_j, b_i), x_{ij})^2$$

where n three-dimensional points are seen in m views; $x_{ij}$ is the projection of the $i_{th}$ point on image j; $v_{ij}$ are binary variables set to 1 if point i is visible in image j and 0 otherwise; each camera j is parameterized by a vector $a_j$; each three-dimensional point is parameterized by a vector $b_i$; $Q(a_j, b_i)$ is the projection of point i on image j; and d(x,y) is the Euclidian distance between image points represented by vectors x and y.

A problem addressed by the present disclosure is that a second set of cameras is present, and we need to come up with the transform between the two sets of cameras. Regular BA could be used for one camera in different poses. However, a goal here is to figure out the transform that translates between a first camera (native CV) and a second one (convergent CV). The solution of CBA includes adding one or more additional parameters to the error, i.e., what is being minimized, plus one or more additional terms to the minimization function itself. Specifically, in this example of CBA, the additional parameter is the transform T between native CV and convergent CV camera positions, and the additional term is the difference between results of the transformed cameras.

Devices that have a fairly accurate local positioning system (such as PDR, using rotary encoders, a local computer vision system, etc.) and a CV system for localizing the position of the device relative to an existing described point cloud (e.g., a convergent CV system), can use CBA to increase the accuracy of the positioning relative to the cloud, and of the cloud itself, as well as calculating an accurate transform between the local positioning system coordinate space and the coordinate space of the described point cloud.

In general, CBA includes first obtaining a number of device positions relative to the cloud (and the 2D-3D point correspondences at those times, etc.), as well as the device's positions in local space at those times. An initial transform is then calculated between the local positions and the cloud positions. CBA is then run, extending the function-to-minimize to include the "error" between the transformed-native-cams (cams here being positions+orientations) and the cloud-cams, and extending the parameters-to-optimize to include the transformation coefficients (the elements of the rotation and translation matrices). After which, you have an accurate transform between the two spaces, and the positions of the cams relative to the cloud has been improved with the additional positioning information provided by the local positioning system (as per normal BA, the 3D points have also been improved).

Figure 7:
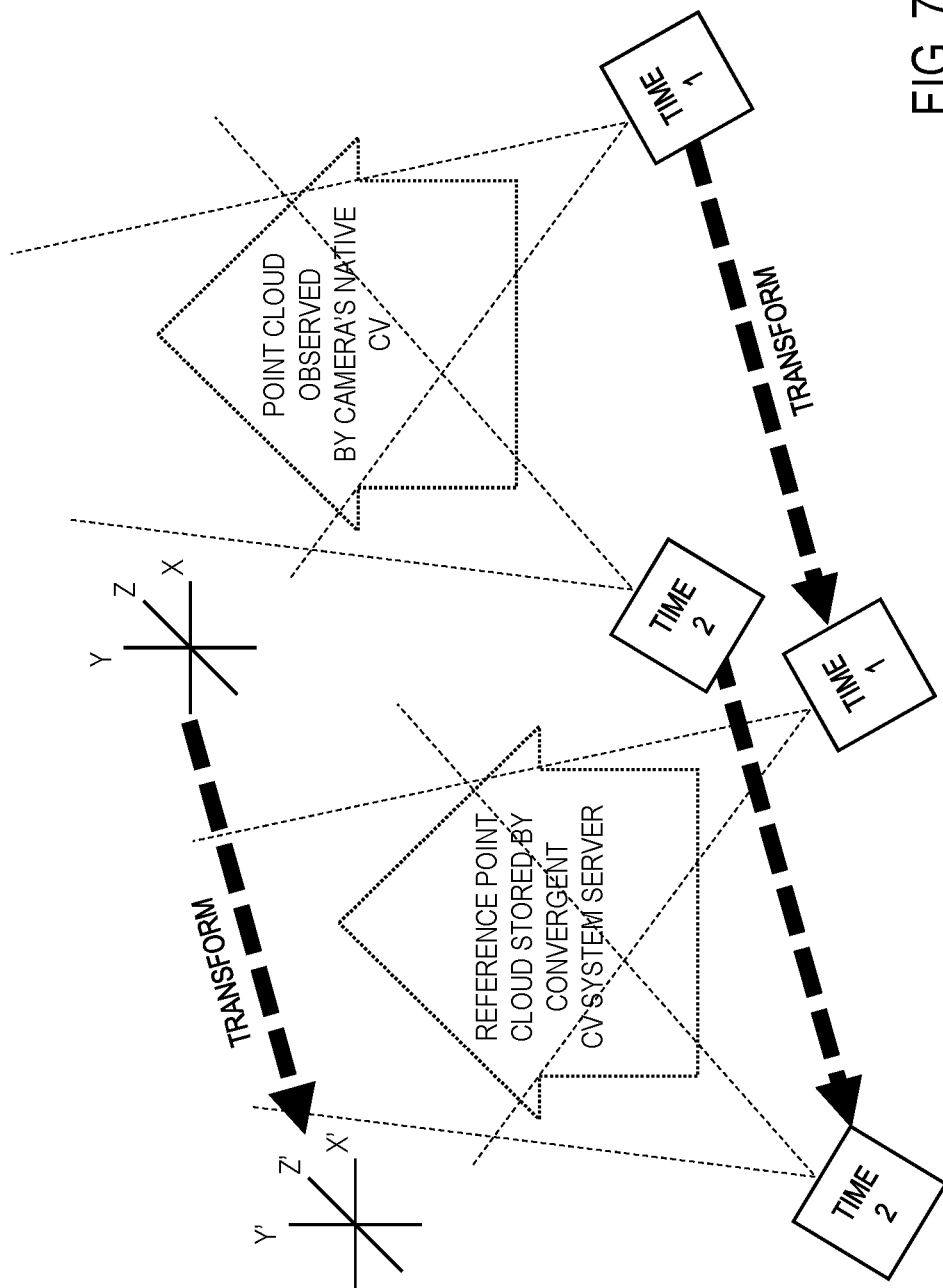
FIG. 7 is a schematic diagram showing a point cloud observed by a camera in two different poses, showing a reference point cloud and corresponding transformation of the camera poses.

As described above with respect to system 100, and as illustrate in FIG. 7, a first device localizes to certain points, and then a transform is calculated between that device's space and the coordinate space of a reference point cloud, using the convergent CV system. AR content has known positions relative to the reference point cloud (e.g., using the same coordinate system). The transform can therefore be utilized to display this AR content on the first device, by first transforming it to the device's coordinate system and then rendering the content. A second device may then arrive and localize to the same reference point cloud. The same AR content can therefore be rendered accurately on the second device, e.g., without knowledge or presence of the first device. However, because the convergent CV system runs less frequently than the native CV system, it acts as a limiting factor on the accuracy of the transform. Furthermore, point cloud construction involves known inaccuracies caused by triangulation errors, etc. Accordingly, in some examples, the transform is continually recalculated and updated. The use of CBA can address this situation by producing a superior transform.

Figure 8:
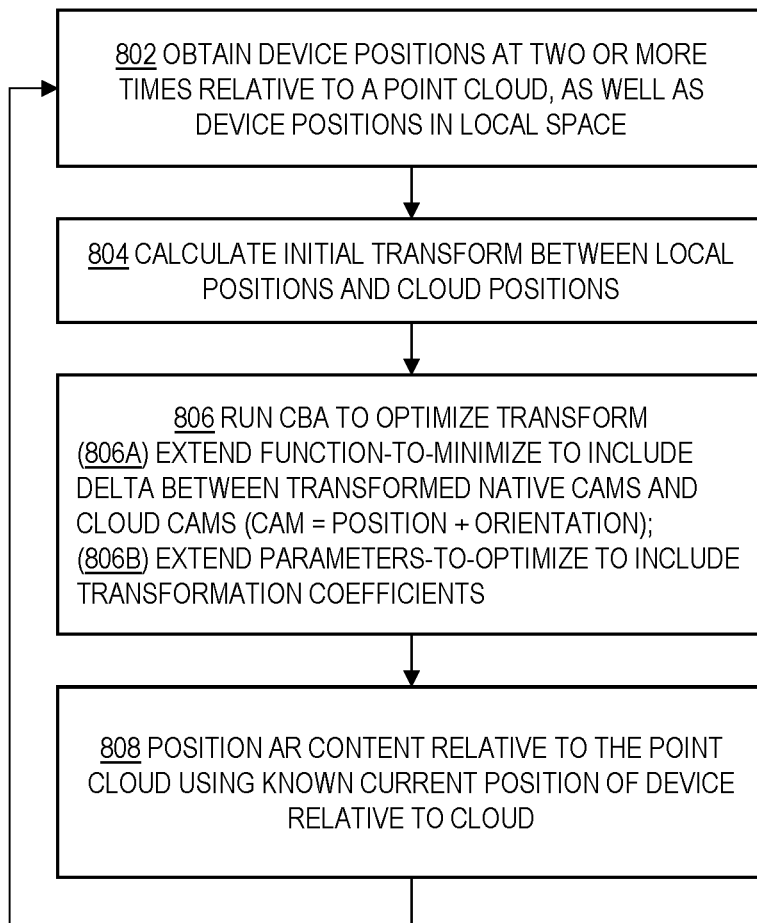
FIG. 8 is a flow chart depicting steps of an illustrative method for performing constrained bundle adjustment (CBA) in accordance with the present disclosure.

FIG. 8 is a flowchart illustrating steps performed in an illustrative method, and may not recite the complete process or all steps of the method. Although various steps of method 800 are described below and depicted in FIG. 8, the steps need not necessarily all be performed, and in some cases may be performed simultaneously or in a different order than the order shown.

At step 802, device positions (or poses) are obtained at two or more times (i.e., at n times where n>1). These positions include reference positions ($P_R$) defined relative to a reference point cloud and native positions ($P_N$) defined relative to local space.

At step 804, an initial transform T is calculated between positions $P_R$ and $P_N$. Any suitable method may be used to calculate this transform. In some examples, this step includes taking the rotation difference between each pair of cams (pseudocode: CloudCamRotation.transpose( )*LocalCamRotation) and averaging them to produce a rotational transform. The 3D positions of the local cams are then rotated with this transform. Differences between each pair of 3D positions (pseudocode: CloudCamPosition−LocalCamPosition) are then calculated and averaged to produce a translational transform. With more position-pairs to work with, the result will be more accurate.

At step 806, run a constrained bundle adjustment (CBA) algorithm to optimize transform T. Specifically, the CBA algorithm includes a standard bundle adjustment modified as follows. In step 806A, the function being minimized is extended to include a delta between the native cameras ($P_N$) and the transformed reference cameras ($T(P_R)$). This delta may be calculated as the sum of delta(i), where delta(i) is the difference between $P_N$ and $T(P_R)$ at time i, and i=1 to n.

At step 806B, the parameters being optimized further include the transformation coefficients of transform T. In terms of the explanation of BA laid out above, step 806 in general may correspond to the following:

$$\min_{a_j, b_i, T} \left( \sum_{j=1}^{m} \alpha_j \, diff(c_j, \, t(T, \, b_j)) + \sum_{i=1}^{n} \sum_{j=1}^{m} v_{ij} d(Q(a_j, \, b_i), \, x_{ij})^2 \right)$$

where $\alpha_j$ is a proportionality factor for each camera, T is an affine transform, $t(T, b_j)$ applies the affine transform to the camera $b_j$, and where c is a vector of "native" camera extrinsics, and diff( ) is a function that calculates the measure of difference between the two camera extrinsics (much like d( ) calculates the difference between a reprojected point and a screenpoint). For example a diff( ) function may include the norm of the difference between the camera positions. In some examples, this may be extended to be the norm of the difference of the camera positions+the norm of the difference between the vectors used by the Rodrigues rotation formula (e.g., multiplied by a scaling factor). As with all implementations of bundle adjustment methods, embodiments of the present algorithm approximate this solution rather than calculating it explicitly.

At step 808, AR content is positioned relative to the reference point cloud, using the known current position of the device relative to the reference point cloud. In other words, the optimized transform is utilized to convert between coordinate systems and ensure the AR content is placed appropriately across CV systems and participating devices.

Visualizing AR content placed relative to the cloud is significantly simplified once the current position of the device has been calculated relative to the reference cloud. Additionally, the reference cloud positioning system is running slower than the local/native positioning system (e.g., once a second instead of once a frame), and the calculated transform for the most recent keyframe can be applied to the local positioning to produce a more-frequently updated position relative to the cloud. As this transform gets updated periodically rather than continuously, this method may cause "jumps" in the positioning of AR content. This may be dealt with by lerp (linear interpolation) between the old transform and the new transform over several frames. Other suitable methods of dealing with this might take the form of a Kalman filter, etc.

In some examples, rather than using the transform calculated from CBA directly, a new transform is calculated between the local/native positions and the post-CBA cloud-cam (convergent CV system) positions, weighted toward the more recent keyframes. This may be performed in a manner similar to calculation of the initial transform (see above), but multiplying the relevant components by weight and then dividing the summed total by the sum of the weights.

The CBA method described herein cause the native and convergent CV system cameras to be more in line with each other, with the point cloud, and with the actual positioning data gathered from the native CV system. The relative positions of the cameras are used as a constraint on the bundle adjustment process. This constrains multiple cameras in three-dimensional space, so that the problem of longitudinal error is decreased.

D. Illustrative Data Processing System

Figure 9:
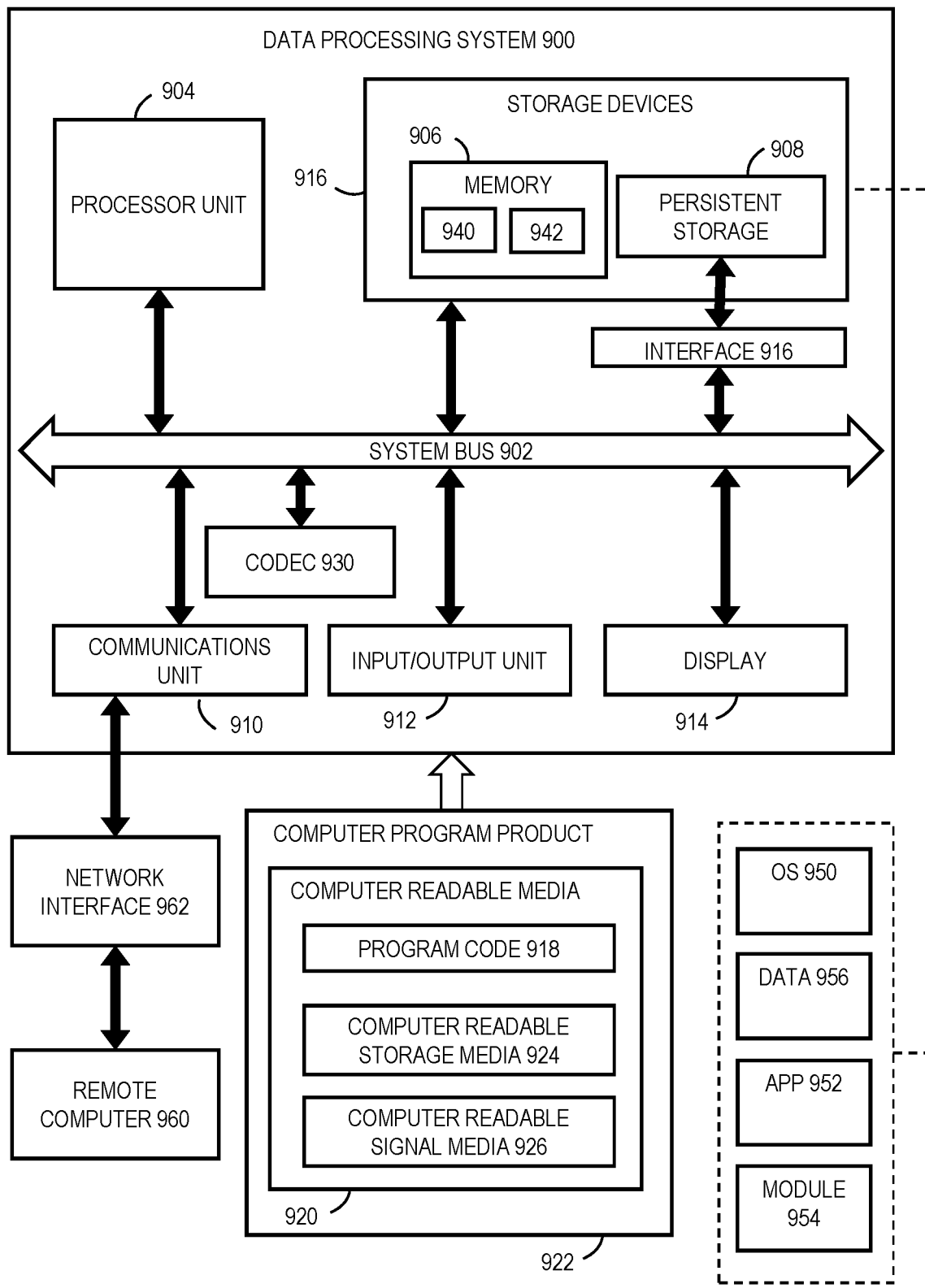
FIG. 9 is a schematic diagram of a data processing system (AKA computer) suitable for use with aspects of the present disclosure.

As shown in FIG. 9, this example describes a data processing system 900 (also referred to as a computer, computing system, and/or computer system) in accordance with aspects of the present disclosure. In this example, data processing system 900 is an illustrative data processing system suitable for implementing aspects of the convergent CV system described herein. More specifically, in some examples, mobile digital devices (MDDs) may comprise embodiments of data processing systems (e.g., smartphones, tablets, personal computers). In some examples, servers and other computing systems may comprise embodiments of the data processing systems described in this section.

In this illustrative example, data processing system 900 includes a system bus 902 (also referred to as communications framework). System bus 902 may provide communications between a processor unit 904 (also referred to as a processor or processors), a memory 906, a persistent storage 908, a communications unit 910, an input/output (I/O) unit 912, a codec 930, and/or a display 914. Memory 906, persistent storage 908, communications unit 910, input/output (I/O) unit 912, display 914, and codec 930 are examples of resources that may be accessible by processor unit 904 via system bus 902.

Processor unit 904 serves to run instructions that may be loaded into memory 906. Processor unit 904 may comprise a number of processors, a multi-processor core, and/or a particular type of processor or processors (e.g., a central processing unit (CPU), graphics processing unit (GPU), etc.), depending on the particular implementation. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device may include any suitable hardware capable of storing information (e.g., digital information), such as data, program code in functional form, and/or other suitable information, either on a temporary basis or a permanent basis.

Storage devices 916 also may be referred to as computer-readable storage devices or computer-readable media. Memory 906 may include a volatile storage memory 940 and a non-volatile memory 942. In some examples, a basic input/output system (BIOS), containing the basic routines to transfer information between elements within the data processing system 900, such as during start-up, may be stored in non-volatile memory 942. Persistent storage 908 may take various forms, depending on the particular implementation.

Persistent storage 908 may contain one or more components or devices. For example, persistent storage 908 may include one or more devices such as a magnetic disk drive (also referred to as a hard disk drive or HDD), solid state disk (SSD), floppy disk drive, tape drive, flash memory card, memory stick, and/or the like, or any combination of these. One or more of these devices may be removable and/or portable, e.g., a removable hard drive. Persistent storage 908 may include one or more storage media separately or in combination with other storage media, including an optical disk drive such as a compact disk ROM device (CD-ROM), CD recordable drive (CD-R Drive), CD rewritable drive (CD-RW Drive), and/or a digital versatile disk ROM drive (DVD-ROM). To facilitate connection of the persistent storage devices 908 to system bus 902, a removable or non-removable interface is typically used, such as interface 928.

Input/output (I/O) unit 912 allows for input and output of data with other devices that may be connected to data processing system 900 (i.e., input devices and output devices). For example, input device 932 may include one or more pointing and/or information-input devices such as a keyboard, a mouse, a trackball, stylus, touch pad or touch screen, microphone, joystick, game pad, satellite dish, scanner, TV tuner card, digital camera, digital video camera, web camera, and/or the like. These and other input devices may connect to processor unit 904 through system bus 902 via interface port(s) 936. Interface port(s) 936 may include, for example, a serial port, a parallel port, a game port, and/or a universal serial bus (USB).

Output devices 934 may use some of the same types of ports, and in some cases the same actual ports, as input device(s) 932. For example, a USB port may be used to provide input to data processing system 900 and to output information from data processing system 900 to an output device 934. Output adapter 938 is provided to illustrate that there are some output devices 934 (e.g., monitors, speakers, and printers, among others) which require special adapters. Output adapters 938 may include, e.g. video and sounds cards that provide a means of connection between the output device 934 and system bus 902. Other devices and/or systems of devices may provide both input and output capabilities, such as remote computer(s) 960. Display 914 may include any suitable human-machine interface or other mechanism configured to display information to a user, e.g., a CRT, LED, or LCD monitor or screen, etc.

Communications unit 910 refers to any suitable hardware and/or software employed to provide for communications with other data processing systems or devices. While communication unit 910 is shown inside data processing system 900, it may in some examples be at least partially external to data processing system 900. Communications unit 910 may include internal and external technologies, e.g., modems (including regular telephone grade modems, cable modems, and DSL modems), ISDN adapters, and/or wired and wireless Ethernet cards, hubs, routers, etc. Data processing system 900 may operate in a networked environment, using logical connections to one or more remote computers 960. A remote computer(s) 960 may include a personal computer (PC), a server, a router, a network PC, a workstation, a microprocessor-based appliance, a peer device, a smart phone, a tablet, another network note, and/or the like. Remote computer(s) 960 typically include many of the elements described relative to data processing system 900. Remote computer(s) 960 may be logically connected to data processing system 900 through a network interface 962 which is connected to data processing system 900 via communications unit 910. Network interface 962 encompasses wired and/or wireless communication networks, such as local-area networks (LAN), wide-area networks (WAN), and cellular networks. LAN technologies may include Fiber Distributed Data Interface (FDDI), Copper Distributed Data Interface (CDDI), Ethernet, Token Ring, and/or the like. WAN technologies include point-to-point links, circuit switching networks (e.g., Integrated Services Digital networks (ISDN) and variations thereon), packet switching networks, and Digital Subscriber Lines (DSL).

Codec 930 may include an encoder, a decoder, or both, comprising hardware, software, or a combination of hardware and software. Codec 930 may include any suitable device and/or software configured to encode, compress, and/or encrypt a data stream or signal for transmission and storage, and to decode the data stream or signal by decoding, decompressing, and/or decrypting the data stream or signal (e.g., for playback or editing of a video). Although codec 930 is depicted as a separate component, codec 930 may be contained or implemented in memory, e.g., non-volatile memory 942.

Non-volatile memory 942 may include read only memory (ROM), programmable ROM (PROM), electrically programmable ROM (EPROM), electrically erasable programmable ROM (EEPROM), flash memory, and/or the like, or any combination of these. Volatile memory 940 may include random access memory (RAM), which may act as external cache memory. RAM may comprise static RAM (SRAM), dynamic RAM (DRAM), synchronous DRAM (SDRAM), double data rate SDRAM (DDR SDRAM), enhanced SDRAM (ESDRAM), and/or the like, or any combination of these.

Instructions for the operating system, applications, and/or programs may be located in storage devices 916, which are in communication with processor unit 904 through system bus 902. In these illustrative examples, the instructions are in a functional form in persistent storage 908. These instructions may be loaded into memory 906 for execution by processor unit 904. Processes of one or more embodiments of the present disclosure may be performed by processor unit 904 using computer-implemented instructions, which may be located in a memory, such as memory 906.

These instructions are referred to as program instructions, program code, computer usable program code, or computer-readable program code executed by a processor in processor unit 904. The program code in the different embodiments may be embodied on different physical or computer-readable storage media, such as memory 906 or persistent storage 908. Program code 918 may be located in a functional form on computer-readable media 920 that is selectively removable and may be loaded onto or transferred to data processing system 900 for execution by processor unit 904. Program code 918 and computer-readable media 920 form computer program product 922 in these examples. In one example, computer-readable media 920 may comprise computer-readable storage media 924 or computer-readable signal media 926.

Computer-readable storage media 924 may include, for example, an optical or magnetic disk that is inserted or placed into a drive or other device that is part of persistent storage 908 for transfer onto a storage device, such as a hard drive, that is part of persistent storage 908. Computer-readable storage media 924 also may take the form of a persistent storage, such as a hard drive, a thumb drive, or a flash memory, that is connected to data processing system 900. In some instances, computer-readable storage media 924 may not be removable from data processing system 900.

In these examples, computer-readable storage media 924 is a non-transitory, physical or tangible storage device used to store program code 918 rather than a medium that propagates or transmits program code 918. Computer-readable storage media 924 is also referred to as a computer-readable tangible storage device or a computer-readable physical storage device. In other words, computer-readable storage media 924 is media that can be touched by a person.

Alternatively, program code 918 may be transferred to data processing system 900, e.g., remotely over a network, using computer-readable signal media 926. Computer-readable signal media 926 may be, for example, a propagated data signal containing program code 918. For example, computer-readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 918 may be downloaded over a network to persistent storage 908 from another device or data processing system through computer-readable signal media 926 for use within data processing system 900. For instance, program code stored in a computer-readable storage medium in a server data processing system may be downloaded over a network from the server to data processing system 900. The computer providing program code 918 may be a server computer, a client computer, or some other device capable of storing and transmitting program code 918.

In some examples, program code 918 may comprise an operating system (OS) 950. Operating system 950, which may be stored on persistent storage 908, controls and allocates resources of data processing system 900. One or more applications 952 take advantage of the operating system's management of resources via program modules 954, and program data 956 stored on storage devices 916. OS 950 may include any suitable software system configured to manage and expose hardware resources of computer 900 for sharing and use by applications 952. In some examples, OS 950 provides application programming interfaces (APIs) that facilitate connection of different type of hardware and/or provide applications 952 access to hardware and OS services. In some examples, certain applications 952 may provide further services for use by other applications 952, e.g., as is the case with so-called "middleware." Aspects of present disclosure may be implemented with respect to various operating systems or combinations of operating systems.

The different components illustrated for data processing system 900 are not meant to provide architectural limitations to the manner in which different embodiments may be implemented. One or more embodiments of the present disclosure may be implemented in a data processing system that includes fewer components or includes components in addition to and/or in place of those illustrated for computer 900. Other components shown in FIG. 9 can be varied from the examples depicted. Different embodiments may be implemented using any hardware device or system capable of running program code. As one example, data processing system 900 may include organic components integrated with inorganic components and/or may be comprised entirely of organic components (excluding a human being). For example, a storage device may be comprised of an organic semiconductor.

In some examples, processor unit 904 may take the form of a hardware unit having hardware circuits that are specifically manufactured or configured for a particular use, or to produce a particular outcome or progress. This type of hardware may perform operations without needing program code 918 to be loaded into a memory from a storage device to be configured to perform the operations. For example, processor unit 904 may be a circuit system, an application specific integrated circuit (ASIC), a programmable logic device, or some other suitable type of hardware configured (e.g., preconfigured or reconfigured) to perform a number of operations. With a programmable logic device, for example, the device is configured to perform the number of operations and may be reconfigured at a later time. Examples of programmable logic devices include, a programmable logic array, a field programmable logic array, a field programmable gate array (FPGA), and other suitable hardware devices. With this type of implementation, executable instructions (e.g., program code 918) may be implemented as hardware, e.g., by specifying an FPGA configuration using a hardware description language (HDL) and then using a resulting binary file to (re)configure the FPGA.

In another example, data processing system 900 may be implemented as an FPGA-based (or in some cases ASIC-based), dedicated-purpose set of state machines (e.g., Finite State Machines (FSM)), which may allow critical tasks to be isolated and run on custom hardware. Whereas a processor such as a CPU can be described as a shared-use, general purpose state machine that executes instructions provided to it, FPGA-based state machine(s) are constructed for a special purpose, and may execute hardware-coded logic without sharing resources. Such systems are often utilized for safety-related and mission-critical tasks.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

In another example, system bus 902 may comprise one or more buses, such as a system bus or an input/output bus. Of course, the bus system may be implemented using any suitable type of architecture that provides for a transfer of data between different components or devices attached to the bus system. System bus 902 may include several types of bus structure(s) including memory bus or memory controller, a peripheral bus or external bus, and/or a local bus using any variety of available bus architectures (e.g., Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI)).

Additionally, communications unit 910 may include a number of devices that transmit data, receive data, or both transmit and receive data. Communications unit 910 may be, for example, a modem or a network adapter, two network adapters, or some combination thereof. Further, a memory may be, for example, memory 906, or a cache, such as that found in an interface and memory controller hub that may be present in system bus 902.

E. Illustrative Combinations and Additional Examples

This section describes additional aspects and features of convergent CV systems and related methods, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A computer-implemented method for displaying augmented reality (AR) content, the method comprising:

receiving, by a mobile digital device (MDD) over a computer network, a reference point cloud corresponding to a trackable feature in an environment and an AR content item, wherein the AR content item comprises AR positioning information defined relative to the reference point cloud and wherein the MDD is disposed in the environment;

recognizing a local point cloud corresponding to the trackable feature, using a camera (or other sensor) and a native CV system of the MDD;

determining a position and an orientation of the MDD relative to the reference point cloud, using a second CV system of the MDD and the camera;

determining a transform between the local point cloud and the reference point cloud; and visualizing the AR content item on a display of the MDD using the native CV system by applying the transform to the AR positioning information;

wherein determining the transform between the local point cloud and the reference point cloud includes executing a constrained bundle adjustment (BA) method using processing logic to optimize the transform, wherein the constrained BA method comprises minimizing an error function including reprojection error plus a measure of differences between native and transformed camera positions.

A1. The method of paragraph A0, wherein minimizing the error function comprises using a gradient descent method.

A2. The method of any one of paragraphs A0 through A1, wherein minimizing the error function comprises using a Levenberg Marquardt method.

A3. The method of any one of paragraphs A0 through A2, wherein parameters being optimized while minimizing the error function include a camera vector, a vector of three-dimensional points, and a vector including transformation coefficients of the transform.

A4. The method of any one of paragraphs A0 through A3, wherein determining the transform between the local point cloud and the reference point cloud comprises calculating an initial transform for input into the constrained BA method, and calculating the initial transform includes:

taking a rotation difference between respective pairs of native and secondary camera positions and averaging the rotation differences to generate a rotational transform;

applying the rotational transform to three-dimensional (3D) positions of the native camera positions; and determining and averaging differences between each pair of 3D native camera position and 3D secondary camera positions to produce a translational transform.

A5. The method of any one of paragraphs A0 through A4, wherein the second CV system of the MDD runs less frequently than the native CV system, and a same version of the transform is utilized by the native CV system until updated by the second CV system.

A6. The method of paragraph A5, wherein the second CV system runs once every 10 to 60 frames (e.g., once every 30 frames) with respect to input from the camera, and the native CV system runs at least once every frame.

A7. The method of paragraph A5, wherein the second CV system determines an earlier transform at a first time and a later transform at a second time, and visualizing the AR content item on the display of the MDD using the native CV system by applying the transform to the AR positioning information comprises using interpolation between the first time and the second time to transition from the earlier transform to the later transform.

A8. The method of any one of paragraphs A0 through A7, wherein the MDD comprises the processing logic executing the constrained BA method.

A9. The method of any one of paragraphs A0 through A8, wherein recognizing the local point cloud comprises generating or updating the local point cloud using the camera and the native CV system of the MDD.

A10. The method of anyone of paragraphs A0 through A9, wherein the MDD is a first MDD, the method further comprising:

receiving, by a second MDD over the computer network, the reference point cloud corresponding to the trackable feature in the environment and the AR content item, including the AR positioning information;

recognizing a second local point cloud corresponding to the trackable feature, using a camera (or other sensor) and a native CV system of the second MDD;

determining a position and an orientation of the second MDD relative to the reference point cloud, using a second CV system of the second MDD and the camera of the second MDD;

determining a second transform between the second local point cloud and the reference point cloud; and visualizing the AR content item on a display of the second MDD using the native CV system of the second MDD by applying the second transform to the AR positioning information.

B0. A system for viewing augmented reality (AR) content, the system comprising:

a mobile digital device (MDD) disposed in an environment and in communication with a computer network, the MDD including a camera, a display, and processing logic configured to determine a position and orientation of the MDD using input from the camera and a native computer vision (CV) system, wherein the MDD further comprises a second CV system independent of the native CV system, and the processing logic is further configured to:

receive, from a server over the computer network, a reference point cloud corresponding to a trackable feature in the environment and an AR content item, wherein the AR content item comprises AR positioning information defined relative to the reference point cloud;

recognize a local point cloud corresponding to the trackable feature, using the camera and the native CV system;

determine a position and an orientation of the MDD relative to the reference point cloud, using the second CV system and the camera;

determine a transform between the local point cloud and the reference point cloud; and visualize the AR content item on a display of the MDD using the native CV system by applying the transform to the AR positioning information;

wherein determining the transform between the local point cloud and the reference point cloud includes executing a constrained bundle adjustment (BA) method to optimize the transform, wherein the constrained BA method comprises minimizing an error function including reprojection error plus a measure of differences between native and transformed camera positions.

B1. The system of paragraph B0, wherein minimizing the error function comprises using a gradient descent method.

B2. The system of any one of paragraphs B0 through B1, wherein minimizing the error function comprises using a Levenberg Marquardt method.

B3. The system of any one of paragraphs B0 through B2, wherein parameters being optimized while minimizing the error function include a camera vector, a vector of three-dimensional points, and a vector including transformation coefficients of the transform.

B4. The system of any one of paragraphs B0 through B3, wherein determining the transform between the local point cloud and the reference point cloud comprises calculating an initial transform for input into the constrained BA method, and calculating the initial transform includes:

taking a rotation difference between respective pairs of native and secondary camera positions and averaging the rotation differences to generate a rotational transform;

applying the rotational transform to three-dimensional (3D) positions of the native camera positions; and determining and averaging differences between each pair of 3D native camera position and 3D secondary camera positions to produce a translational transform.

B5. The system of any one of paragraphs B through B4, wherein the second CV system of the MDD runs less frequently than the native CV system, and a same version of the transform is utilized by the native CV system until updated by the second CV system.

B6. The system of paragraph B5, wherein the second CV system runs once every 10 to 60 frames (e.g., once every 30 frames) with respect to input from the camera, and the native CV system runs at least once every frame.

B7. The system of paragraph B5, wherein the second CV system determines an earlier transform at a first time and a later transform at a second time, and visualizing the AR content item on the display of the MDD using the native CV system by applying the transform to the AR positioning information comprises using interpolation between the first time and the second time to transition from the earlier transform to the later transform.

B8. The method of any one of paragraphs B0 through B7, wherein recognizing the local point cloud comprises generating the local point cloud using the camera and the native CV system of the MDD.

B9. The system of any one of paragraphs B0 through B8, wherein the MDD is a first MDD, the system further comprising:

a second MDD disposed in the environment and in communication with the computer network, the second MDD including a camera, a display, and processing logic configured to determine a position and orientation of the second MDD using input from the camera and a native computer vision (CV) system of the second MDD;

wherein the second MDD further comprises a second CV system independent of the native CV system of the second MDD, and the processing logic of the second MDD is further configured to:

receive over the computer network the reference point cloud corresponding to the trackable feature in the environment and the AR content item, including the AR positioning information;

recognize a second local point cloud corresponding to the trackable feature, using the camera and the native CV system of the second MDD;

determine a position and an orientation of the second MDD relative to the reference point cloud, using the second CV system of the second MDD and the camera of the second MDD;

determine a second transform between the second local point cloud and the reference point cloud; and visualize the AR content item on a display of the second MDD using the native CV system of the second MDD by applying the second transform to the AR positioning information.

C0. A computer-implemented method for displaying augmented reality (AR) content, the method comprising:

receiving, by a mobile digital device (MDD) over a computer network, a reference point cloud corresponding to a trackable feature in an environment and an AR content item, wherein the AR content item comprises AR positioning information defined relative to the reference point cloud and the MDD is disposed in the environment;

recognizing a local point cloud corresponding to the trackable feature, using a camera (or other sensor) and a native CV system of the MDD;

determining a position and an orientation of the MDD relative to the reference point cloud, using a second CV system of the MDD and the camera;

determining a transform between the local point cloud and the reference point cloud; and visualizing the AR content item on a display of the MDD using the native CV system by applying the transform to the AR positioning information.

C1. The method of paragraph C0, wherein recognizing the local point cloud comprises generating the local point cloud using the camera and the native CV system of the MDD.

C2. The method of paragraph C0, wherein the MDD is a first MDD, the method further comprising:

receiving, by a second MDD over the computer network, the reference point cloud corresponding to the trackable feature in the environment and the AR content item, including the AR positioning information;

recognizing a second local point cloud corresponding to the trackable feature, using a camera and a native CV system of the second MDD;

determining a position and an orientation of the second MDD relative to the reference point cloud, using a second CV system of the second MDD and the camera of the second MDD;

determining a second transform between the second local point cloud and the reference point cloud; and visualizing the AR content item on a display of the second MDD using the native CV system of the second MDD by applying the second transform to the AR positioning information.

D0. A computer-implemented method for displaying augmented reality (AR) content, the method comprising:

receiving, by a mobile digital device (MDD) over a computer network, a reference point cloud corresponding to a trackable feature in an environment and an AR content item, wherein the AR content item comprises AR positioning information defined relative to the reference point cloud and the MDD is disposed in the environment;

determining a position and an orientation of the MDD relative to the reference point cloud, using a camera (or other sensor) and a computer vision (CV) system of the MDD; and visualizing the AR content item on a display of the MDD using the determined position and orientation;

wherein determining the position and the orientation of the MDD relative to the reference point cloud includes executing a weighted random sample consensus (RANSAC) method using processing logic to estimate a pose of the camera, wherein the weighted RANSAC method comprises:

performing a RANSAC algorithm to determine a current estimated pose, using an inlier distance threshold to determine inliers and selecting correspondences based on a calculated weighting of a plurality of points;

updating the calculated weighting of the plurality of points based on respective relationships between each point and the current inlier distance threshold;

determining a strength of the current estimated pose based on the current inlier distance threshold and how many points currently qualify as inliers; and repeating the RANSAC algorithm, the updating of the calculated weighting, and the determining of the strength of the current estimated pose, automatically reducing the inlier distance threshold with each iteration.

D1. The method of paragraph D0, wherein the weighted RANSAC method further comprises boosting the calculated weighting of the points that currently qualify as inliers, such that the current inliers are more likely to be selected in a subsequent iteration.

D2. The method of paragraph D1, wherein boosting the calculated weighting of the current inliers comprises multiplying a respective weight of each inlier by a factor.

D3. The method of paragraph D2, wherein the factor is 2.

D4. The method of any one of paragraphs D0 through D3, wherein repeating of the RANSAC algorithm, the updating of the calculated weighting, and the determining of the strength of the current estimated pose is performed until the strength of the current estimated pose is less than the strength of a previous estimated pose, then reverting to the previous estimated pose and exiting the weighted RANSAC method.

D5. The method of any one of paragraphs D0 through D4, wherein the CV system comprises a native CV system and a second CV system, the method further comprising:

generating a local point cloud corresponding to the trackable feature, using the camera and the native CV system of the MDD; and determining a transform between the local point cloud and the reference point cloud;

wherein the AR content item is visualized on the display of the MDD using the native CV system, by applying the transform to the AR positioning information.

D6. The method of paragraph D5, wherein the second CV system of the MDD runs less frequently than the native CV system, and a same version of the transform is utilized by the native CV system until updated by the second CV system.

D7. The method of paragraph D6, wherein the second CV system runs once every 10 to 60 frames with respect to input from the camera, and the native CV system runs at least once every frame.

D8. The method of any one of paragraphs D0 through D7, wherein the inlier distance threshold is automatically halved with each iteration.

D9. The method of any one of paragraphs D0 through D8, wherein updating the calculated weighting of the plurality of points comprises:

determining the relationship between a reprojection error of each point and the current inlier distance threshold;

assigning a low but nonzero weight to any point having a relationship falling above a selected second threshold; and assigning a higher weight to any point having a relationship falling below the selected second threshold.

D10. The method of any one of paragraphs D0 through D9, wherein the higher weight assigned to each point below the selected second threshold is assigned on a curve, such that the higher weight is lowered as the relationship approaches the selected second threshold.

D11. The method of any one of paragraphs D0 through D10, wherein the MDD is a first MDD, the method further comprising:

receiving, by a second MDD over the computer network, the reference point cloud corresponding to the trackable feature in the environment and the AR content item, including the AR positioning information;

recognizing a second local point cloud corresponding to the trackable feature, using a camera and a native CV system of the second MDD;

determining a position and an orientation of the second MDD relative to the reference point cloud, using a second CV system of the second MDD and the camera of the second MDD;

determining a second transform between the second local point cloud and the reference point cloud; and visualizing the AR content item on a display of the second MDD using the native CV system of the second MDD by applying the second transform to the AR positioning information.

E0. A system for viewing augmented reality (AR) content, the system comprising:

a mobile digital device (MDD) disposed in an environment and in communication with a computer network, the MDD including a camera (and/or other sensor), a display, and processing logic configured to:

receive, from a server over the computer network, a reference point cloud corresponding to a trackable feature in the environment and an AR content item, wherein the AR content item comprises AR positioning information defined relative to the reference point cloud; and determine a position and an orientation of the MDD relative to the reference point cloud, using a computer vision (CV) system of the MDD and the camera;

wherein determining the position and the orientation of the MDD relative to the reference point cloud includes executing a weighted random sample consensus (RANSAC) method using processing logic to estimate a pose of the camera, wherein the weighted RANSAC method comprises:

performing a RANSAC algorithm to determine a current estimated pose, using an inlier distance threshold to determine inliers and selecting candidate correspondences based on a calculated weighting of a plurality of points;

updating the calculated weighting of the plurality of points based on respective relationships between each point and the current inlier distance threshold;

determining a strength of the current estimated pose based on a current quantity of inlier points and the current inlier distance threshold; and repeating the RANSAC algorithm, the updating of the calculated weighting, and the determining of the strength of the current estimated pose, automatically reducing the inlier distance threshold with each iteration.

E1. The system of paragraph E0, wherein the weighted RANSAC method further comprises boosting the calculated weighting of the points that currently qualify as inliers, such that the current inliers are more likely to be selected in a subsequent iteration.

E2. The system of paragraph E1, wherein boosting the calculated weighting of the current inliers comprises multiplying a respective weight of each inlier by a factor.

E3. The system of paragraph E2, wherein the factor is 2.

E4. The system of any one of paragraphs E0 through E3, wherein repeating of the RANSAC algorithm, the updating of the calculated weighting, and the determining of the strength of the current estimated pose is performed until the strength of the current estimated pose is less than the strength of a previous estimated pose, then reverting to the previous estimated pose and exiting the weighted RANSAC method.

E5. The system of any one of paragraphs E through E4, wherein the CV system of the MDD comprises a native CV system and a second CV system independent of the native CV system, and the processing logic is further configured to:

generate a local point cloud corresponding to the trackable feature, using the camera and the native CV system;

determine a mathematical transform between the local point cloud and the reference point cloud;

visualize the AR content item on the display of the MDD using the native CV system by applying the transform to the AR positioning information.

E6. The system of paragraph E5, wherein the second CV system of the MDD runs less frequently than the native CV system, and a same version of the transform is utilized by the native CV system until updated by the second CV system.

E7. The system of paragraph E6, wherein the second CV system runs once every 10 to 60 frames with respect to input from the camera, and the native CV system runs at least once every frame.

E8. The system of any one of paragraphs E through E7, wherein the inlier distance threshold is halved with each iteration.

E9. The system of any one of paragraphs E through E8, wherein updating the calculated weighting of the plurality of points comprises:

determining the relationship of each point to the current inlier distance threshold;

assigning a low but nonzero weight to any point having a relationship falling above a selected second threshold; and assigning a higher weight to any point having a relationship falling below the second threshold.

E10. The system of paragraph E9, wherein the higher weight assigned to each point below the selected threshold is assigned on a curve, such that the higher weight is lowered as the relationship approaches the second threshold.

E11. The system of any one of paragraphs E0 through E10, wherein the MDD is a first MDD, the system further comprising:

a second MDD disposed in the environment and in communication with the computer network, the second MDD including a camera, a display, a native computer vision (CV) system, a second CV system independent of the native CV system, and processing logic configured to:

receive over the computer network the reference point cloud corresponding to the trackable feature in the environment and the AR content item, including the AR positioning information;

recognize a second local point cloud corresponding to the trackable feature, using the camera and the native CV system of the second MDD;

determine a position and an orientation of the second MDD relative to the reference point cloud, using the second CV system of the second MDD and the camera of the second MDD;

determine a second transform between the second local point cloud and the reference point cloud; and visualize the AR content item on a display of the second MDD using the native CV system of the second MDD by applying the second transform to the AR positioning information.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A computer-implemented method for displaying augmented reality (AR) content, the method comprising:

determining, using a camera of a mobile digital device (MDD) and a computer vision (CV) system of the MDD, a position and an orientation of the MDD relative to a reference point cloud corresponding to a trackable feature in an environment, the MDD being disposed in the environment; and visualizing an AR content item on a display of the MDD using the determined position and orientation;

wherein determining the position and the orientation of the MDD relative to the reference point cloud includes executing a weighted random sample consensus (RANSAC) method using processing logic to estimate a pose of the camera, wherein the weighted RANSAC method comprises:

receiving an output from a RANSAC algorithm, wherein the output comprises a current estimated pose determined by the RANSAC algorithm, and wherein the RANSAC algorithm uses a current inlier distance threshold to determine inliers and selects one or more correspondences based on a calculated weighting of a plurality of points;

updating the calculated weighting of the plurality of points;

determining a strength of the current estimated pose based on the current inlier distance threshold and how many points currently qualify as inliers; and repeating the receiving of the output from the RANSAC algorithm, the updating of the calculated weighting, and the determining of the strength of the current estimated pose, wherein the current inlier distance threshold used by the RANSAC algorithm is automatically reduced at each iteration.

2. The method of claim 1, wherein the weighted RANSAC method further comprises boosting the calculated weighting of the points that currently qualify as inliers, such that the current inliers are more likely to be selected in a subsequent iteration.

3. The method of claim 1, wherein repeating the receiving of the output from the RANSAC algorithm, the updating of the calculated weighting, and the determining of the strength of the current estimated pose is performed until the strength of the current estimated pose is less than the strength of a previous estimated pose, then reverting to the previous estimated pose and exiting the weighted RANSAC method.

4. The method of claim 1, wherein the CV system comprises a native CV system and a second CV system, the method further comprising:
  generating a local point cloud corresponding to the trackable feature, using the camera and the native CV system of the MDD; and
  determining a transform between the local point cloud and the reference point cloud;
  wherein the AR content item is visualized on the display of the MDD using the native CV system, by applying the transform to the AR positioning information.

5. The method of claim 1, wherein the updating of the calculated weighting of the plurality of points is based on relationships between respective reprojection errors of each point and the current inlier distance threshold.

6. The method of claim 1, further comprising receiving the reference point cloud and the AR content item at the MDD over a computer network, wherein the AR content item comprises AR positioning information defined relative to the reference point cloud.

7. The method of claim 1, wherein the RANSAC algorithm is executed at the MDD.

8. A system for camera localization, the system comprising:
  a mobile digital device (MDD) disposed in an environment, the MDD including a camera and processing logic configured to determine a position and an orientation of the MDD relative to a reference point cloud corresponding to a trackable feature in the environment, using a computer vision (CV) system of the MDD and the camera;
  wherein determining the position and the orientation of the MDD relative to the reference point cloud includes executing a weighted random sample consensus (RANSAC) method using processing logic to estimate a pose of the camera, wherein the weighted RANSAC method comprises:
    performing a RANSAC algorithm to determine a current estimated pose, using a current inlier distance threshold to determine inliers and selecting candidate correspondences based on a calculated weighting of a plurality of points;
    updating the calculated weighting of the plurality of points based on respective relationships between each point and the current inlier distance threshold;
    determining a strength of the current estimated pose based on a current quantity of inlier points and the current inlier distance threshold; and
    repeating the RANSAC algorithm, the updating of the calculated weighting, and the determining of the strength of the current estimated pose, automatically reducing the current inlier distance threshold with each iteration.

9. The system of claim 8, wherein the weighted RANSAC method further comprises boosting the calculated weighting of the points that currently qualify as inliers, such that the current inliers are more likely to be selected in a subsequent iteration.

10. The system of claim 8, wherein repeating of the RANSAC algorithm, the updating of the calculated weighting, and the determining of the strength of the current estimated pose is performed until the strength of the current estimated pose is less than the strength of a previous estimated pose, then reverting to the previous estimated pose and exiting the weighted RANSAC method.

11. The system of claim 8, wherein the CV system of the MDD comprises a native CV system and a second CV system independent of the native CV system, and the processing logic is further configured to:
  generate a local point cloud corresponding to the trackable feature, using the camera and the native CV system;
  determine a mathematical transform between the local point cloud and the reference point cloud; and
  visualize an AR content item on a display of the MDD using the native CV system by applying the mathematical transform to AR positioning information defined relative to the reference point cloud.

12. The system of claim 11, wherein the second CV system of the MDD runs less frequently than the native CV system, and a same version of the mathematical transform is utilized by the native CV system until updated by the second CV system.

13. The system of claim 8, wherein the current inlier distance threshold is halved with each iteration.

14. The system of claim 8, wherein updating the calculated weighting of the plurality of points comprises:
  determining a relationship of each point to the current inlier distance threshold;
  assigning a low but nonzero weight to any point having a relationship falling above a selected second threshold; and
  assigning a higher weight to any point having a relationship falling below the second threshold.

15. The system of claim 8, wherein the processing logic is further configured to:
  receive, from a server over a computer network, the reference point cloud and an AR content item, wherein the AR content item comprises AR positioning information defined relative to the reference point cloud; and
  visualize the AR content item on a display of the MDD based on the determined position and orientation of the MDD relative to the reference point cloud.

16. The system of claim 8, wherein the MDD is a first MDD, the system further comprising:
  a second MDD disposed in the environment and in communication with a computer network, the second MDD including a camera, a display, a native computer vision (CV) system, a second CV system independent of the native CV system, and processing logic configured to:
  receive over the computer network the reference point cloud corresponding to the trackable feature in the environment and an AR content item, including AR positioning information defined relative to the reference point cloud;
  recognize a second local point cloud corresponding to the trackable feature, using the camera and the native CV system of the second MDD;

determine a position and an orientation of the second MDD relative to the reference point cloud, using the second CV system of the second MDD and the camera of the second MDD;

determine a second transform between the second local point cloud and the reference point cloud; and visualize the AR content item on a display of the second MDD using the native CV system of the second MDD by applying the second transform to the AR positioning information.

17. A computer-implemented method for displaying augmented reality (AR) content, the method comprising:

determining, using a camera of a mobile digital device (MDD) and a computer vision (CV) system of the MDD, a position and an orientation of the MDD relative to a reference point cloud corresponding to a trackable feature in an environment, the MDD being disposed in the environment; and visualizing an AR content item on a display of the MDD using the determined position and orientation;

wherein determining the position and the orientation of the MDD relative to the reference point cloud includes obtaining an estimated pose of the camera, and wherein obtaining the estimated pose of the camera includes:

determining a best candidate pose, wherein determining the best candidate pose includes:

determining a plurality of candidate poses based on respective subsets of correspondences, each correspondence comprising a 3D point and a corresponding 2D point, and each respective subset being randomly selected from a larger set of correspondences based on a selected weighting of the correspondences, determining a respective number of inliers for each of the candidate poses, wherein the respective number of inliers comprises a number of correspondences for which the 2D point of the correspondence is consistent, within an inlier distance threshold, with a reprojection of the 3D point of the correspondence based on the respective candidate pose; and identifying the best candidate pose among the plurality of candidate poses, based on the numbers of inliers;

updating the selected weighting of the correspondences based on a calculated fitness of each correspondence with respect to the best candidate pose;

determining a strength of the best candidate pose based on the inlier distance threshold and the number of inliers corresponding to the best candidate pose; and repeating the determining of the best candidate pose based on the updated selected weighting and an updated inlier distance threshold, the updating of the selected weighting, and the determining of the strength of the best candidate pose.

18. The method of claim 17, wherein updating the selected weighting of the correspondences includes determining respective reprojection errors of each of the correspondences, and selecting a respective inverse of each reprojection error as an updated weight of the associated correspondence.

19. The method of claim 17, wherein the updated inlier distance threshold is half the inlier distance threshold.

20. The method of claim 17, wherein the selected weighting of the correspondences is selected based on inverse matching distances associated with ORB descriptors matched with respective points of the correspondences.

* * * * *